(12) United States Patent
Xu

(10) Patent No.: US 7,595,350 B2
(45) Date of Patent: Sep. 29, 2009

(54) ULTRAPOROUS SOL GEL MONOLITHS

(75) Inventor: Dengfeng Xu, Irvine, CA (US)

(73) Assignee: Varian, Inc., Palo Alto, CA (US)

( * ) Notice: Subject to any disclaimer, the term of this patent is extended or adjusted under 35 U.S.C. 154(b) by 0 days.

(21) Appl. No.: 12/209,061

(22) Filed: Sep. 11, 2008

(65) Prior Publication Data

US 2009/0008327 A1    Jan. 8, 2009

Related U.S. Application Data

(62) Division of application No. 11/018,168, filed on Dec. 20, 2004, now Pat. No. 7,439,272.

(51) Int. Cl.
*B01D 15/08* (2006.01)
*C01B 33/155* (2006.01)
*G01N 30/00* (2006.01)

(52) U.S. Cl. .................. 516/111; 210/656; 436/161; 516/100; 516/110

(58) Field of Classification Search .......... 516/110, 516/111, 100; 210/656; 436/161
See application file for complete search history.

(56) References Cited

U.S. PATENT DOCUMENTS

| 5,624,875 | A  | * | 4/1997 | Nakanishi et al. | ............. 501/39 |
| 6,207,098 | B1 | * | 3/2001 | Nakanishi et al. | ........... 264/414 |
| 7,052,532 | B1 | * | 5/2006 | Liu et al. | ..................... 96/154 |

\* cited by examiner

*Primary Examiner*—Timothy J. Kugel
(74) *Attorney, Agent, or Firm*—Cynthia R. Moore; Bella Fishman

(57) ABSTRACT

Ultraporous sol gel monoliths and methods for preparing the same are provided, having superior flow characteristics for chromatography and analytical chemistry applications. The methods for forming an ultra porous sol-gel monolith include (a) forming a solution comprising a porogen, a matrix dissolving catalyst and a sol gel precursor; (b) allowing the solution to form a gel; and (c) drying the gel at an elevated temperature. The ultraporous sol gel monoliths are characterized by a porosity of up to about 97%, a BET surface area of at least about 50 $m^2/g$ and substantially no micropores.

2 Claims, 6 Drawing Sheets

ULTRAPOROUS SOL GEL MONOLITHS

CROSS REFERENCE TO RELATED APPLICATIONS

This patent application is a Divisional of U.S. patent application Ser. No. 11/018,168, filed Dec. 20, 2004, now U.S. Pat. No. 7,439,272.

FIELD OF THE INVENTION

This invention relates generally to sorbents useful in analytical applications and methods of preparing and using them.

BACKGROUND OF THE INVENTION

A typical sol-gel process involves the transition of a liquid colloidal solution "sol" phase into a solid porous "gel" phase, followed by drying and sintering the resulting gel monolith at elevated temperatures. The conventional sol-gel process for the formation of ceramic or glass materials consists of hydrolysis of a metal alkoxide precursor, typically tetramethylorthosilicate or tetraethylorthosilicate for forming silica, in the presence of an acid or base catalyst. The reaction mixture is placed in a desired receptacle and undergoes hydrolysis and polymerization, resulting in a wet porous gel monolith or matrix formed in situ. After drying the wet gel monolith in a controlled environment to remove the fluid from the pores, the dry gel monolith can be calcined into a solid glass-phase monolith. The materials produced by this process display connected open pores with a generally narrow range of the pore size distribution. This type of air-dried xerogel typically possesses numerous pores or channels well below 15 Å in diameter, depending on the synthesis conditions.

In the use of these porous materials as support or separation devices, the average size and size distribution of pores should be precisely controlled so as to optimize the function of supported substances or the separation efficiency. For many applications the porous material should contain a defined mesopore size distribution in addition to the network of macropores present. To that end, many investigators have attempted to control the size and distribution of macropores by adjusting the reaction parameters of gel preparation, including adding pore forming agents during gel preparation, or remodeling the interior surface to enlarge and/or provide a more uniform size distribution of mesopores.

For example, the influence of the catalyst concentration on the pore sizes of the resultant gel monoliths is illustrated by U.S. Pat. No. 5,264,197 to Wang, which describes preparing a sol gel monolithic material by adjusting the relative concentrations of an alcohol and/or catalysts such as HCl or HF at concentrations up to a maximum of about 0.05 moles per mole of tetraethoxysilane. This patent describes that when the alcohol is ethanol and the catalysts are hydrofluoric acid and hydrochloric acid, the average pore radii in the dry gel can be tailored to selected values in the range of 10 Å to 100 Å by controlling the relative concentrations of the ethanol and the catalyst. Correspondingly, the gel surface area is reported to be tailored to values in the range of 600 to 1100 $m^2/g$. However, the process does not produce enough macropores which are generally required for chromatographic separations.

U.S. Patent Application Publication Nos. 2003/0068266 and 2003/0069122 describe that the use of HF can promote the formation of larger pore sizes, thus reducing the tendency for cracking of gel monoliths. However, the inventors point out that the use of catalysts such as HF also shortens gelation times, and can result in insufficient time for processing, or for bubbles to diffuse out of the gel, thereby degrading the quality of the gel produced. A method of manufacturing a xerogel monolith is described that includes preparing a first solution comprising metal alkoxide, a second solution comprising a catalyst, and mixing the first and second solutions together, where at least one of the solutions is cooled to achieve a mixture temperature for the third solution which is substantially below room temperature. In so doing, the mixture reportedly has a significantly longer gelation time at the mixture temperature as compared to a room temperature.

Another approach is described in U.S. Pat. No. 5,624,875 to Nakanishi, which describes the solidification of the solution to form a sol gel, the aging of the gel for an appropriate period, and then the immersion of the gel in a matrix dissolving agent, such as sodium hydroxide, aqueous ammonia, or hydrofluoric acid. This patent states that during the immersion process, substitution of external solution with the solvent-rich phase takes place, allowing contact of the external solution with the inner-surface of silica-rich phase, and that when the external solution can dissolve the matrix, the inner wall is subjected to a dissolution and re-precipitation process, resulting in the loss of smaller pores and the increase of larger pores. This patent states that this step is essential for creating sharply distributed mesopores. Thus, this patent demonstrates that the sol gel must first be formed and then immersed in a matrix dissolving agent in order to obtain the desired mesopore distribution, a time consuming and difficult to control step.

Similarly, U.S. Pat. No. 6,207,098 to Nakanishi reports a process for producing inorganic porous materials composed of glass or glass ceramic components reportedly having interconnected continuous macropores with a median diameter larger than 0.1 µm and mesopores in the walls of said macropores having a median diameter between 2 and 100 nm. The process reportedly includes (a) dissolving a water-soluble polymer or other pore forming agent and a precursor for a matrix dissolving agent in a medium that promotes the hydrolysis of an organometallic compound; (b) mixing with an organometallic compound which contains hydrolyzable ligands; (c) solidifying the mixture through the sol-gel transition, whereby a gel is prepared which has three dimensional interconnected phase domains one rich in solvent the other rich in inorganic component in which surface pores are contained; (d) setting the matrix dissolving agent free from its precursor, whereby the matrix dissolving agent modifies the structure of said inorganic component; (e) removing the solution by evaporation drying and/or heat-treatment; (f) calcining the gel to form the porous material. However, it is very difficult to eliminate micropores using this process, limiting the performance during chromatographic separations. Further, this process requires preparing a gel and then performing an additional step to modify the structure of the gel, which is a complicated and time consuming procedure.

U.S. Pat. Nos. 6,562,744 and 6,531,060 to Nakanishi further describe inorganic porous materials contained in a confined space having at least one dimension less than 1 mm across and in liquid tight contact with the walls of the container, such as a capillary. The process involves thermally decomposing a component that modifies the gel structure, such as an amide compound that is capable of making the reaction system basic when the compound is thermolysed.

U.S. Pat. No. 6,398,962 to Cabrera further describes using the method of Nakanishi for preparation of a monolithic sorbent for use in simulated moving bed chromatography. The monolithic sorbent is reportedly based on shaped $SiO_2$ bodies having macropores of diameter from 2 to 20 µm and mesopores of diameter from 2 to 100 nm. However, as described above, the process for preparing the monoliths is laborious and time consuming.

U.S. Patent Application Publication No. 2003/0150811 describes a porous inorganic/organic hybrid material and a process for forming the same wherein the pores of diameter less than about 34 Å reportedly contribute less than 110 m$^2$/g to less than 50 m$^2$/g to the specific surface area of the material. The process reportedly involves forming porous inorganic/organic hybrid particles, modifying the pore structure of the porous hybrid particles, and coalescing the porous hybrid particles to form a monolith material. This application also reports the hydrothermal treatment of hybrid monolithic silica, formed in a similar process as described in the above patents, in order to modify the pore structure. However, these processes are laborious and time consuming, and may not eliminate micropores.

U.S. Patent Application Publication No. 2001/0033931 assigned to Waters describes porous inorganic/organic hybrid particles reportedly having a chromatographically-enhancing pore geometry. The process for preparing the porous particles reportedly involves the three step process of forming the particles, suspending the particles in an aqueous medium in surfactant and gelling the particles into porous spherical particles of hybrid silica using a base catalyst, and modifying the pore structure by hydrothermal treatment. The process is thus laborious and time consuming.

Sol gel monoliths are also subject to cracking and shrinking during the drying step of the fabrication process. Approaches to reduce the cracking have been attempted, focused on increasing the pore sizes of the gel monolith to reduce the capillary stresses generated during drying. For example, U.S. Pat. No. 5,023,208 to Pope describes subjecting the gel to a hydrothermal aging treatment, which reportedly causes silica particles to migrate and fill small pores in the porous gel matrix, and increase the average pore size. U.S. Pat. No. 6,210,570 to Holloway describes that "syneresis," or the shrinkage in volume as a hydrosol progresses to a hydrogel, can occur to the extent that a volume of a material can decrease by a factor of 100. U.S. Pat. No. 6,620,368 to Wang describes that the density of the gel at the end of the first stage of liquid removal process corresponds to a shrinkage in the linear dimension of between about 15% and 35%.

U.S. Pat. No. 6,528,167 to O'Gara describes a method of preparing chromatographic particles for performing separations or for participating in chemical reactions, including: (a) prepolymerizing a mixture of an organoalkoxysilane and a tetraalkoxysilane in the presence of an acid catalyst to produce a polyalkoxysiloxane; (b) preparing an aqueous suspension of the polyalkoxy siloxane further comprising a surfactant, and gelling in the presence of a base catalyst so as to produce porous particles having silicon $C_{1-7}$ alkyl groups, substituted or unsubstituted aryl groups, substituted or unsubstituted $C_{1-7}$ alkylene, alkenylene, alkynylene, or arylene groups; (c) modifying the pore structure of the porous particles by hydrothermal treatment; and (d) replacing one or more surface $C_{1-7}$ alkyl groups, substituted or unsubstituted aryl groups, substituted or unsubstituted $C_{1-7}$ alkylene, alkenylene, alkynylene, or arylene groups of the particle with hydroxyl, fluorine, alkoxy, aryloxy, or substituted siloxane groups. The replacing step involves reacting the hybrid particle with aqueous $H_2O_2$, KF, and $KHCO_3$ in an organic solution, which may further include a porogen.

U.S. Pat. No. 6,346,140 to Miyazawa describes a process for preparing a porous solid for gas adsorption separations wherein the micropore volume is at least 10% and preferably from 20% to 50% of the total pore volume. This patent also describes porous solids having total micropore volumes of at least 0.05 cc/g, and mesopore volumes of 0.25 to 0.58 cc/g. In addition, this patent teaches the importance of limiting the surfactant below a concentration of 29 g/l in order to allow formation of micropores. Thus this patent teaches the production of a sol gel having significant micropores.

Thus, numerous processes for preparing sol gel monolithic sorbents are known in the art of chromatographic separations. However, production of sorbents having the desired distribution of macro- and mesopores with substantially no micropores remains an unsolved problem. In addition, the procedures known in the art are complicated and difficult to control, costly and time consuming. Therefore, there is a need in the art for methods of producing ultraporous sol gel monolithic sorbents providing superior flow characteristics and having the desired distribution of macro- and mesopores with substantially no micropores. In addition, there is a need in the art for procedures that are simple and uncomplicated, provide good control over the reaction and the products, and that are less costly and time consuming to produce and to use.

SUMMARY OF THE INVENTION

Accordingly, it is a primary object of the invention to address the aforementioned need in the art by providing an ultraporous sol gel monolith providing superior porosity and mobile phase flow characteristics.

It is another object of the invention to provide an ultraporous sol gel monolith having a desired macropore volume.

It is yet another object of the invention to provide an ultraporous sol gel monolith having a desired mesopore surface area and volume.

It is a further object of the invention to provide an ultraporous sol gel monolith having substantially no micropores.

Accordingly, there is provided an ultraporous sol gel monolith, wherein the sol gel monolith is characterized by having a porosity of up to about 97%. Preferably, the porosity of the sol gel monolith is at least about 60%. In particular embodiments, the ultraporous sol gel monolith is characterized by a porosity of from about 85% to about 97%. The ultraporous sol gel monolith provides superior porosity while having substantially no micropores.

The ultraporous sol gel monolith is characterized by a total pore volume sufficient to provide a porous monolith, preferably at least about 1.0 cc/g, more preferably at least about 2.0 cc/g. In particular embodiments, the ultraporous sol gel monolith is characterized by a total pore volume of from about 4.0 cc/g to about 7.0 cc/g.

The ultraporous sol gel monolith is characterized by a BET surface area from at least about 50 m$^2$/g and more preferably at least about 100 m$^2$/g. In particular embodiments, the BET surface area is from about 200 m$^2$/g to about 700 m$^2$/g.

The ultraporous sol gel monolith is formed from a sol gel precursor, typically a metal or metalloid compound having hydroxyl or hydrolyzable ligands and that are capable of undergoing a sol gel reaction to form a sol gel. Suitable hydrolyzable ligands include, but not limit to, halogen, alkoxy, amino or acyloxy. The metal or metalloid compound preferably comprises Si, and in some embodiments, can include Ge, Sn, Al, Ga, Mg, Mb, Co, Ni, Ga, Be, Y, La, Pb, V, Nb, Ti, Zr, Ta, W, Hf, or combinations thereof. In certain preferred embodiments, the sol gel precursor is an alkoxide and/or halide of silicon, germanium, aluminum, titanium, zirconium, vanadium, or hafnium, or mixtures thereof.

The ultraporous sol gel monolith can be further modified, such that the surface of the sol gel monolith is modified with polar or nonpolar moieties to provide particular adsorption characteristics when used as a sorbent or catalyst, for example. In particular embodiments, the surface can be modified with a silane having the formula

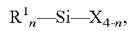
$R^1_n—Si—X_{4-n}$, wherein $R^1$ is independently selected from hydrogen, $C_1$-$C_{100}$ substituted or unsubstituted hydrocarbyl, cycloalkyl, heterocycloalkyl, aryl, or heteroaryl; wherein the substituents are selected from $C_1$-$C_{12}$ hydrocarbyl, hydroxyl, alkoxy, halogen, amino, nitro, sulfo, cyano, glycidyl, carbamido, and carbonyl, wherein n is 0, 1, 2, or 3, and X is a leaving group. The sol gel monolith can also be modified with an endcapping reagent, such as trimethylchlorosilane.

The invention further provides a method for forming an ultra porous sol-gel monolith, comprising (a) forming a solution comprising a porogen, a catalyst and a sol gel precursor; (b) allowing the solution to form a gel; and (c) drying the gel at an elevated temperature. The solution of step (a) can be aqueous, or a mixture of organic solvents and water. Preferably, the organic solvent is a water miscible solvent, such as an alkanol, formamide. More preferably, the water miscible solvent is a straight chain or branched alkanol, such as an alkanol having the formula $CH_3(CH_2)_nOH$, wherein n is from 0-12. Ethanol, isopropanol, and methanol are preferred solvents, and can be used alone or as mixtures.

The catalyst is a matrix dissolving agent, and can further comprise additional catalysts such as HCl or nitric acid. Preferably the matrix dissolving agent is hydrofluoric acid at a concentration of up to 1.0 mole per mole of the sol-gel precursor. The hydrofluoric acid can also be provided by a hydrofluoric acid source. Hydrofluoric acid sources include fluorinated and/or fluoride containing compounds that can generate HF through hydrolysis or dissociation in the solution of step (a), before or during the gelation process. In particular embodiments, hydrofluoric acid sources include, without limitation, $F_2(g)$, fluorides of Group I elements, such as $KHF_2$; fluorides of Group II elements; fluorides of Group III elements such as $BF_3$; fluorides of Group IV elements such as $SiF_4$, $GeF_4$, and fluorosilanes (e.g., $SiFH_3$, fluorotriethoxysilane, fluorodichloroethoxysilane), fluorogermanes (e.g., $GeFH_3$, fluorotriethoxygermane); fluorides of group V elements such as $NF_3$, $PF_3$, $PF_5$, $PF_3Cl_2$; fluorides of Group VI elements such as $SF_4$, $SF_6$, as well as fluoride salts such as $NH_4HF_2$, or mixtures thereof. A preferred hydrofluoric acid source is a fluorosilane such as fluorotriethoxysilane. Thus, in certain embodiments, the sol gel precursor can also function to provide some or all of the matrix dissolving agent.

Sol gel precursors include metal or metalloid compounds having hydroxyl or hydrolyzable ligands that are capable of undergoing a sol gel reaction to form a sol gel. Typical metals include silicon, germanium, aluminum, titanium, zirconium, vanadium, niobium, tantalum, tungsten, tin, or hafnium, or mixtures thereof, having reactive metal oxides, halides, amines, etc., capable of reacting to form a sol gel. Additional metal atoms that can be incorporated into the sol gel precursors include magnesium, molybdenum, cobalt, nickel, gallium, beryllium, yttrium, lanthanum, tin, lead, and boron, without limitation.

In particular embodiments, the sol gel precursor can further comprise an organic substituent, and can include an organosilane, for example, such as an alkoxy-, halo-, acyloxy- or amino silane, further comprising an organic substituent, such as a saturated or unsaturated hydrocarbyl substituent, aryl substituent, or mixtures thereof. Typical alkoxysilanes can include, for example, alkyltrialkoxysilane, cycloalkyltrialkoxysilane, dialkyldialkoxysilane, trialkylalkoxysilane, tetraalkoxysilane, vinyltrialkoxysilane, allyltrialkoxysilane, phenylalkyldialkoxysilane, diphenylalkoxysilane, or naphthyltrialkoxysilane, or mixtures thereof. The sol gel precursor comprising an organic substituent can also include other organometallic compounds such as organogermanes, or organosubstituted titanium, aluminum, zirconium or vanadium alkoxides, and the like. In another preferred embodiment, the silane is a mixture of silanes comprising a trialkoxysilane and a tetraalkoxysilane.

The porogen can be a hydrophilic polymer or a surfactant. Suitable hydrophilic polymers include, for example, polyethyleneglycol, sodium polystyrene sulfonate, polyacrylate, polyallylamine, polyethyleneimine, polyethylene oxide, polyvinylpyrrolidone, polymers of amino acids, polysaccharides such as cellulose ethers or esters, such as cellulose acetate, or the like. A preferred hydrophilic polymer is polyethyleneglycol. The molecular weight is not limited to any particular, range and generally can have a molecular weight up to about 1,000,000 g/mole.

The porogen can also be a surfactant, such as a nonionic surfactant, an ionic surfactant, an amphiphilic surfactant, or mixtures thereof. In the practice of the inventive methods, step (a) and (b) can be performed at a temperature between the freezing point and boiling point of the solution, more typically at a temperature of from about 0° C. to about 60° C. In other aspects of the invention, step (b) comprises allowing the solution to form a gel in situ or transferring at least a portion of the solution to a receptacle and allowing the solution to form a gel in the receptacle. Any shape or form of receptacle is suitable, without limitation. For example, the receptacle can be a capillary tubing (e.g., comprising fused silica, borosilicate glass, doped silicate or glass), a mold, a column, a chip, a microfluidics platform, a plate, or an integrated analytical and detection system, e.g., including mass spectrometric detection. Suitable sizes for capillary tubing include diameters of between about 10 µm and about 1000 µm, or more typically between about 100 µm and about 530 µm.

In the practice of the inventive methods, step (c) can be performed at a temperature up to about 400° C. In preferred methods, the temperature is from about 100° to about 200° C., and in other preferred methods, the temperature is from about 200° to about 400° C.

The method for preparing an ultraporous sol gel monolith can further comprise step (d) calcining the gel at a temperature of at least 400° C. Preferably, the gel is calcined at a temperature of from about 400° C. up to about 1000° C. In particular embodiments, the drying and calcining steps are performed at the same time, by, for example, heating the sol gel to dryness at 200° C. and then increasing the temperature to 400° C. or more. In addition, the drying and calcining steps can be performed together by gradually raising the temperature from below about 400° C. to a higher temperature in the range of 400° C. to about 1000° C., or even greater. Furthermore, the ultraporous sol gel monolith can be solidified into a porous glass monolith, which is also useful for chromatographic separation or other purposes, and can include further modifying its pore surfaces, for example, using polymeric, organic or inorganic phases and/or layers that can be bonded and/or coated onto porous glass monolith pore surfaces.

The methods for forming an ultraporous sol gel monolith can be used to prepare a sol gel monolith characterized by a porosity of up to about 97%, a preferred total pore volume of at least about 1.0 cc/g. In particular embodiments, the ultraporous sol gel monolith is characterized by a porosity of from about 85% to about 97% and a total pore volume of from about 4.0 cc/g to 7.0 cc/g. Such an ultraporous sol gel monolith provides a superior chromatography sorbent having a reduced backpressure at chromatographically useful flow rates.

The invention further comprises methods for separating a mixture of analytes, comprising applying the mixture of analytes to the ultraporous sol gel monolith, and eluting the analytes using a mobile phase. The monoliths thus prepared are versatile and suitable for separations utilizing thin layer chromatography, high performance liquid chromatography, reversed phase chromatography, normal phase chromatography, ion chromatography, ion pair chromatography, reverse phase ion pair chromatography, ion exchange chromatography, affinity chromatography, hydrophobic interaction chromatography, size exclusion chromatography, chiral recognition chromatography, perfusion chromatography, electrochromatography, partition chromatography, microcolumn liquid chromatography, capillary chromatography, capillary zone electrophoresis (CZE), nano-LC, open tubular liquid chromatography (OTLC), capillary electrochromatography (CEC), liquid-solid chromatography, preparative chromatography, hydrophilic interaction chromatography, supercritical fluid chromatography, precipitation liquid chromatography, bonded phase chromatography, fast liquid chromatography, flash chromatography, liquid chromatography-mass spectrometry, gas chromatography, microfluidics based separations, chip based separations or solid phase extraction separations, and the like.

Additional objects, advantages and novel features of the invention will be set forth in part in the description which follows, and in part will become apparent to those skilled in the art upon examination of the following, or may be learned by practice of the invention.

DETAILED DESCRIPTION OF THE INVENTION

I. Definitions and Overview

Figure 1A:
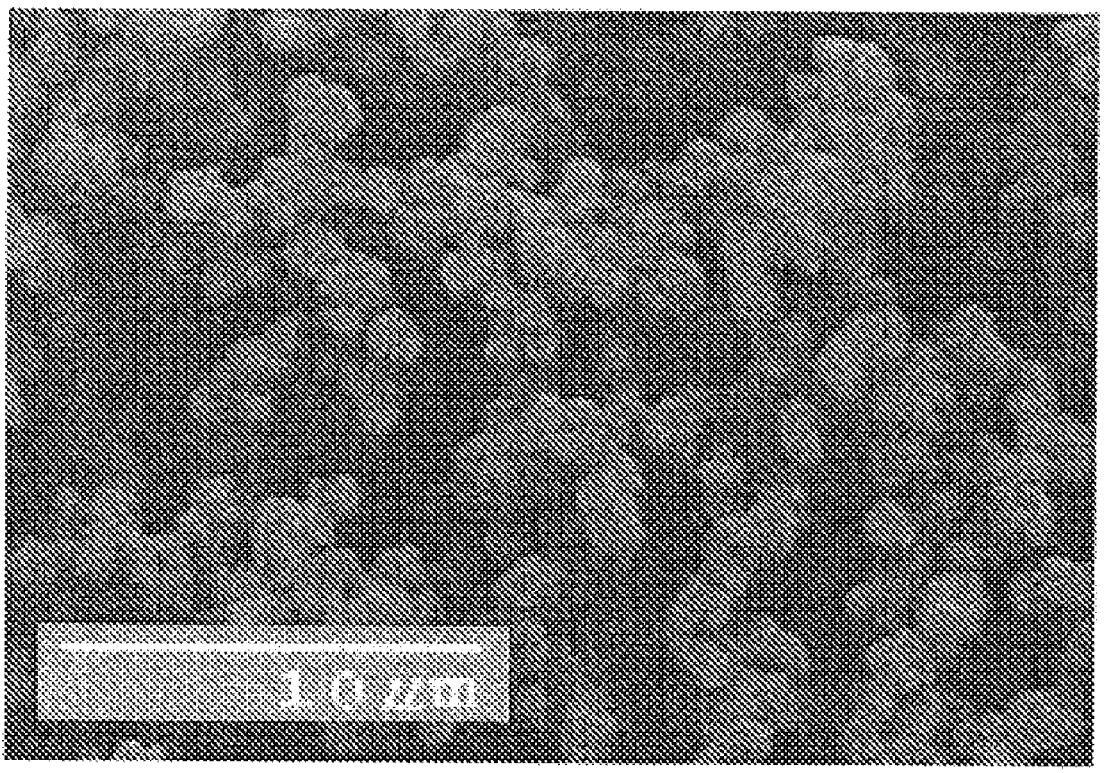
FIG. 1A shows a scanning electron micrograph of an ultraporous sol gel monolith.

Before the present invention is described in detail, it is to be understood that unless otherwise indicated this invention is not limited to specific silanes, porogens, or the like, as such may vary. It is also to be understood that the terminology used herein is for the purpose of describing particular embodiments only and is not intended to limit the scope of the present invention.

It must be noted that as used herein and in the claims, the singular forms "a," "and" and "the" include plural referents unless the context clearly dictates otherwise. Thus, for example, reference to "a porogen" includes two or more porogens; reference to "a silane" includes two or more silanes, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

As used herein, the term "macropores" refers to pores with diameters greater than about 0.05 µm (50 nm, or 500 Å); the term "mesopores" refers to pores with diameters between about 2 nm and 50 nm (20 Å-500 Å); and the term "micropores" refers to pores with diameters less than about 2.0 nm (20 Å).

As used herein, the term "total pore volume" refers to the total volume of the pores in the monolith, and is usually expressed in $cm^3/g$, or cc/g. The total pore volume can be measured by mercury intrusion, where Hg is pumped into the pores under high pressure.

The term "BET surface area" refers to the determination of surface area using the BET method, which can be determined using either a single point or multiple point analysis. For example, multipoint nitrogen sorption measurements can be made on a Micromeritics TriStar 3000 instrument (Norcross, Ga.). The specific surface area can then be calculated using the multipoint BET method, and the mode pore diameter is the most frequent diameter from the log differential pore volume distribution (dV/d log(D) vs. D). The mesopore volume is calculated as the single point total pore volume at $P/P_0 = 0.98$.

The present inventors have surprisingly discovered that including a matrix dissolving catalyst in the sol gel forming solution throughout the gelation process provides ultraporous sol gel monoliths with superior flow characteristics for chromatography and analytical chemistry applications, as well as other applications known in the art. Surprisingly, the sol gels exhibit an ultraporous structure with defined and controlled macropore and mesopore volumes having narrow pore size distributions, while virtually eliminating micropores. Such sol gel monoliths are characterized in having a porosity of up to about 97%, preferably at least about 60% and more preferably, at least about 80%, which provides superior mobile phase flow characteristics, allowing low back pressure and/or increased flow rates during chromatographic applications. The ultraporous sol gel monoliths are also characterized by a total pore volume sufficient to provide a porous monolith, preferably a total pore volume of at least about 1.0 cc/g, and more preferably at least about 2.0 cc/g. In particular embodiments, the total pore volume is in the range of about 4.0 to about 7.0 cc/g. The ultraporous sol gel monoliths have BET surface areas of at least 50 $m^2/g$, and more preferably, at least about 100 $m^2/g$. In a preferred embodiment, the BET surface area is from about 200 $m^2/g$ to about 700 $m^2/g$.

In a significant aspect, the ultraporous sol gel monoliths are characterized by showing substantially no micropores, as evinced by analysis of the volume $N_2$/gram relative to film thickness (or t-plot), as described by Mikail, R., et al. (1968) *J. Colloid Interface Sci.* 26:45. The t-plot analysis shows a y-intercept of zero, indicating that substantially no micropores are present in the sample, within the limits of measurement using current technology. Thus the term "substantially no micropores" means that no pore volume due to micropores is measurable using currently available technologies.

Table 1 presents a summary of representative ultraporous sol gel monolith pore characteristics obtained using the methods of the present invention, as exemplified in the Examples below.

TABLE 1

Ultraporous sol gel monolith pore characteristics

| Example | Total Pore Volume (cc/g) | Mesopore Volume (cc/g) | BET Surface Area ($m^2/g$) | Mesopore Diameter (Mode, Å) |
|---------|--------------------------|------------------------|-----------------------------|------------------------------|
| 1 | 5.4 | 1.13 | 531 | 102 |
| 2 | 4.6 | 1.50 | 290 | 162 |
| 3 | 5.0 | 1.34 | 452 | 142 |
| 4 | 6.9 | 1.46 | 526 | 136 |
| 5 | 6.2 | 1.36 | 550 | 108 |
| 6 | 5.6 | 1.25 | 614 | 104 |
| 7 | 5.2 | 1.11 | 663 | 85 |

All of the representative examples in Table 1 exhibited at least about 85% porosity. The mesopore volume and mode diameter vary and can be controlled by reaction conditions, including the amount and type of porogen, the molecular weight of the porogen, the amount of water, sol gelation temperatures, solvent amount and type, and matrix dissolving catalyst concentration (e.g., HF or fluorosilanes), as well as the sol gel precursor concentration and type. For example, gelation at lower temperatures results in a sol gel having smaller mesopore diameters. Varying the solvent/water ratio and/or catalyst concentrations also changes the pore characteristics that can be obtained. Thus, the experimental conditions can be fine tuned to obtain particular mesopore and macropore size distributions and volumes as well as particular porosities.

These data demonstrate the superior and unexpected properties of the ultraporous sol gel monoliths of the invention.

II. Methods of Preparing Ultraporous Sol Gel Monoliths

The microstructure of a sol gel monolith is influenced by the rates of hydrolysis and polymerization which occur during the gelation of the wet gel monolith from the sol. It is known that a silica-based sol can be formed from tetraethylorthosilicate (TEOS, $(C_2H_5O)_4Si$), for example, by mixing the TEOS with water, a diluent or solvent such as ethyl alcohol, and a catalyst, and hydrolysis occurs with the following reaction:

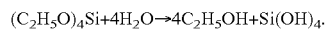

$$(C_2H_5O)_4Si + 4H_2O \rightarrow 4C_2H_5OH + Si(OH)_4.$$

The $Si(OH)_4$ molecules polymerize, resulting in a network of $SiO_2$ and water. Numerous factors influence the kinetics of hydrolysis and polymerization, including the type and concentration of any catalysts and the temperature profile.

The present inventors have surprisingly discovered simple and efficient methods for forming ultraporous sol-gel monoliths having superior porosity, and controllable macropore and mesopore volumes and surface areas, while virtually eliminating micropores. These monolithic structures provide superior sorbents for analytical applications. The methods generally comprise (a) forming a solution comprising a porogen, a catalyst and a sol gel precursor; (b) allowing the solution to form a gel; and (c) drying the gel at an elevated temperature.

The solution of step (a) can be aqueous, or a mixture of organic solvents and water. Preferably, the organic solvent is a water miscible solvent, such as an alkanol, formamide. More preferably, the water miscible solvent is a straight chain or branched alkanol, such as an alkanol having the formula $CH_3(CH_2)_nOH$, wherein n is from 0-12. Ethanol, isopropanol, and methanol are preferred solvents, and can be used alone or as a mixture.

The catalyst is a matrix dissolving agent, and can further comprise additional catalysts such as HCl or nitric acid that do not function as matrix dissolving agents. Preferably the matrix dissolving agent is hydrofluoric acid at a concentration of up to 1.0 mole per mole of the sol-gel precursor. The hydrofluoric acid can also be provided by a hydrofluoric acid source. Hydrofluoric acid sources include fluorinated and/or fluoride containing compounds that can generate HF through hydrolysis or dissociation in the solution of step (a), before or during the gelation process. In particular embodiments, hydrofluoric acid sources include, without limitation, $F_2(g)$, fluorides of Group I elements, such as $KHF_2$; fluorides of Group II elements, fluorides of Group III elements, such as $BF_3$; fluorides of Group IV elements such as $SiF_4$, $GeF_4$, and fluorosilanes (e.g., $SiFH_3$, fluorotriethoxysilane, fluorodichloroethoxysilane), fluorogermanes (e.g., $GeFH_3$, fluorotriethoxygermane); fluorides of group V elements such as $NF_3$, $PF_3$, $PF_5$, $PF_3Cl_2$; fluorides of Group VI elements such as $SF_4$, $SF_6$, as well as fluoride salts such as $NH_4HF_2$, or mixed complexes thereof, or mixtures thereof. A preferred hydrofluoric acid source is a fluorosilane such as fluorotriethoxysilane. Thus, in certain embodiments, the sol gel precursor can also function to provide some or the entire amount of the matrix dissolving agent.

Step (a) and (b) can be performed at a temperature between the solution freezing point and boiling point, typically between a temperature of from about 0° C. to about 60° C. Step (b) can be performed such that the solution forms a gel in situ or the solution or a portion of the solution can be transferred to a receptacle and allowed to form a gel in the receptacle. Any shape or form of receptacle is suitable, without limitation. For example, the receptacle can be a capillary tubing (e.g., comprising fused silica, borosilicate glass, doped silicate or glass), a mold, a column, a chip, a microfluidics platform, a plate, or an integrated analytical and detection system, e.g., including mass spectrometric detection. Suitable sizes for capillary tubing include diameters of between about 10 µm and about 1000 µm, or more typically between about 100 µm and about 530 µm.

Step (c) can be performed at a temperature up to about 400° C. In preferred methods, the temperature is from about 100° to about 200° C., and in other preferred methods, the temperature is from about 200° to about 400° C.

The method for preparing an ultraporous sol gel monolith can further comprise step (d) calcining the gel at a temperature of at least 400° C. Preferably, the gel is calcined at a temperature of from about 400° C. up to about 1000° C. or greater. In particular embodiments, the drying and calcining steps are performed at the same time, by, for example, heating the sol gel to dryness at 200° C. and then increasing the temperature to 400° C. or more. In addition, the drying and calcining steps can be performed together by gradually raising the temperature from below about 400° C. to a higher temperature in the range of 400° C. to about 1000° C. or greater. Further, the ultraporous sol gel monolith can be solidified into a porous glass monolith, which is also useful for chromatographic separation or other purposes, and can be treated to modify its pore surfaces, for example, using polymeric, organic or inorganic phases and/or layers that can be bonded and/or coated onto porous glass monolith pore surfaces.

Organic materials, such as polymers or surfactants used as porogens, can be removed from the porous sol gel by washing or exchanging external solvent prior to drying. However, washing is not a necessary step, and the sol gel can be heated to a temperature high enough to vaporize or thermally decompose any organic porogen in order to remove it. In addition, heating the sol gel monolith provides greater strength. Preferably the sol gel monolith is heated to a temperature sufficient to calcine the polysiloxane structure.

After the sol gel monolith is prepared and optionally calcined, the sol gel monolith can be modified to produce bonded phases, e.g., by bonding desirable chemical groups to provide particular adsorption characteristics. The sol gel can also be endcapped, for example, using a small silylating agent, such as trimethylchlorosilane, to react with residual silanol groups present on the surface. These modifications are discussed in greater detail below.

III. Sol Gel Precursors

Sol gel precursors include metal and metalloid compounds having hydrolyzable ligands that can undergo a sol gel reaction and form sol gels. Suitable hydrolyzable ligands include hydroxyl, alkoxy, halo, amino, or acylamino. The most common metal oxide participating in the sol gel reaction is silica, though other metals and metalloids are also useful, such as zirconia, vanadia, titania, niobium oxide, tantalum oxide, tungsten oxide, tin oxide, hafnium oxide and alumina, or mixtures or composites thereof, having reactive metal oxides, halides, amines, etc., capable of reacting to form a sol gel. Additional metal atoms can be incorporated into the sol gel precursors include magnesium, molybdenum, cobalt, nickel, gallium, beryllium, yttrium, lanthanum, tin, lead, and boron, without limitation.

Preferred metal oxides and alkoxides include, but are not limited to, silicon alkoxides, such as tetramethylorthosilane (TMOS), tetraethylorthosilane (TEOS), fluoroalkoxysilane, or chloroalkoxysilane, germanium alkoxides (such as tetraethylorthogermanium (TEOG)), vanadium alkoxides, aluminum alkoxides, zirconium alkoxides, and titanium alkoxides. Similarly, metal halides, amines, and acyloxy derivatives can also be used in the sol gel reaction.

In preferred embodiments, the sol gel precursor is an alkoxide of silicon, germanium, aluminum, titanium, zirconium, vanadium, or hafnium, or mixtures thereof. In particularly preferred embodiments, the sol gel precursor is a silane. In a more preferred embodiment, the sol gel precursor is a silane such as TEOS or TMOS.

In particular embodiments, the sol gel precursor can further include an organic substituent. Sol gel precursors comprising an organic substituent include, without limitation, organosilanes having saturated or unsaturated hydrocarbyl substituents, such as an alkyltrialkoxysilane, cycloalkyltrialkoxysilane, dialkyldialkoxysilane, trialkylalkoxysilane, tetraalkoxysilane, vinyltrialkoxysilane, allyltrialkoxysilane, aryl substituents, such as phenylalkyldialkoxysilane, diphenylalkoxysilane, or naphthyltrialkoxysilane, or mixtures thereof. The sol gel precursor comprising an organic substituent can also include other organometallic compounds such as organogermanes, or organosubstituted titanium, aluminum, zirconium or vanadium alkoxides, and the like. Suitable hydrocarbyl substituents can be $C_{1-100}$ or more typically $C_{1-30}$. In another preferred embodiment, the silane is a mixture of silanes comprising a trialkoxysilane and a tetraalkoxysilane.

IV. Porogens

The use of porogens aids in the preparation of the ultraporous sol gel monolith. Preparation of the sol gel monolith in the presence of the phase separated volumes provides a sol gel monolith possessing macropores and/or large mesopores, which provide greater porosity to the sol gel monolith, providing superior flow rates for solvent.

In one embodiment, the porogen can be a hydrophilic polymer. The amount and hydrophilicity of the hydrophilic polymer in the sol gel forming solution affects the pore volume and size of macropores formed, and generally, no particular molecular weight range is required, although a molecular weight between about 1,000 to about 1,000,000 g/mole is preferred. The porogen can be selected from, for example, polyethylene glycol (PEG), sodium polystyrene sulfonate, polyacrylate, polyallylamine, polyethyleneimine, polyethylene oxide, polyvinylpyrrolidone, poly(acrylic acid), and can also include polymers of amino acids, and polysaccharides such as cellulose ethers or esters, such as cellulose acetate, or the like. Preferably, the polymer is a PEG having a molecular weight up to about 1,000,000 g/mole.

The porogen can also be an amide solvent, such as formamide, or an amide polymer, such as poly(acrylamide), or a surfactant, such as a nonionic surfactant, an ionic surfactant, an amphiphilic surfactant, or mixtures thereof. A preferred surfactant is the nonionic surfactant Pluronic F68 (also known as Poloxamer).

Exemplary surfactants are those having an HLB value of between about 10-25, such as polyethylene glycol 400 monostearate, polyoxyethylene-4-sorbitan monolaurate, polyoxyethylene-20-sorbitan monooleate, polyoxyethylene-20-sorbitan monopalmitate, polyoxyethylene-20-monolaurate, polyoxyethylene-40-stearate, sodium oleate and the like.

Nonionic surfactants are preferred in certain embodiments and include, for example, polyoxyl stearates such as polyoxyl 40 stearate, polyoxyl 50 stearate, polyoxyl 100 stearate, polyoxyl 12 distearate, polyoxyl 32 distearate, and polyoxyl 150 distearate, and other Myrj™ series of surfactants, or mixtures thereof. Yet another class of surfactant useful as porogens are the triblock co-polymers of ethylene oxide/propylene oxide/ethylene oxide, also known as poloxamers, having the general formula $HO(C_2H_4O)_a(-C_3H_6O)_b(C_2H_4O)_aH$, available under the tradenames Pluronic and Poloxamer. Other useful surfactants include sugar ester surfactants, sorbitan fatty acid esters such as sorbitan monolaurate, sorbitan monopalmitate, sorbitan monostearate, sorbitan tristearate, and other Span™ series surfactants, glycerol fatty acid esters such as glycerol monostearate, polyoxyethylene derivatives such as polyoxyethylene ethers of high molecular weight aliphatic alcohols (e.g., Brij 30, 35, 58, 78 and 99) polyoxyethylene stearate (self emulsifying), polyoxyethylene 40 sorbitol lanolin derivative, polyoxyethylene 75 sorbitol lanolin derivative, polyoxyethylene 6 sorbitol beeswax derivative, polyoxyethylene 20 sorbitol beeswax derivative, polyoxyethylene 20 sorbitol lanolin derivative, polyoxyethylene 50 sorbitol lanolin derivative, polyoxyethylene 23 lauryl ether, polyoxyethylene 2 cetyl ether with butylated hydroxyanisole, polyoxyethylene 10 cetyl ether, polyoxyethylene 20 cetyl ether, polyoxyethylene 2 stearyl ether, polyoxyethylene 10 stearyl ether, polyoxyethylene 20 stearyl ether, polyoxyethylene 21 stearyl ether, polyoxyethylene 20 oleyl ether, polyoxyethylene 40 stearate, polyoxyethylene 50 stearate, polyoxyethylene 100 stearate, polyoxyethylene derivatives of fatty acid esters of sorbitan such as polyoxyethylene 4 sorbitan monostearate, polyoxyethylene 20 sorbitan tristearate, and other Tween™ series of surfactants, phospholipids and phospholipid fatty acid derivatives such as lecithins, fatty amine oxides, fatty acid alkanolamides, propylene glycol monoesters and monoglycerides, such as hydrogenated palm oil monoglyceride, hydrogenated soybean oil monoglyceride, hydrogenated palm stearine monoglyceride, hydrogenated vegetable monoglyceride, hydrogenated cottonseed oil monoglyceride, refined palm oil monoglyceride, partially hydrogenated soybean oil monoglyceride, cotton seed oil monoglyceride sunflower oil monoglyceride, sunflower oil monoglyceride, canola oil monoglyceride, succinylated monoglycerides, acetylated monoglyceride, acetylated hydrogenated vegetable oil monoglyceride, acetylated hydrogenated coconut oil monoglyceride, acetylated hydrogenated soybean oil monoglyceride, glycerol monostearate, monoglycerides with hydrogenated soybean oil, monoglycerides with hydrogenated palm oil, succinylated monoglycerides and monoglycerides, monoglycerides and rapeseed oil, monoglycerides and cottonseed oils, monoglycerides with propylene glycol monoester sodium stearoyl lactylate silicon dioxide, diglycerides, triglycerides, polyoxyethylene steroidal esters, Triton-X series of surfactants produced from octylphenol polymerized with ethylene oxide, where the number "100" in the trade name is indirectly related to the number of ethylene oxide units in the structure, (e.g., Triton X-100™ has an average of N=9.5 ethylene oxide units per molecule, with an average molecular weight of 625) and having lower and higher mole adducts present in lesser amounts in commercial products, as well as compounds having a similar structure to Triton X-100™, including Igepal CA-630™ and Nonidet P-40M (NP-40™, N-lauroylsarcosine, Sigma Chemical Co., St. Louis, Mo.), and the like. Any hydrocarbon chains in the surfactant molecules can be saturated or unsaturated, hydrogenated or unhydrogenated.

An especially preferred family of surfactants are the poloxamer surfactants, which are a:b:a triblock co-polymers of ethylene oxide:propylene oxide:ethylene oxide. The "a" and "b" represent the average number of monomer units for each block of the polymer chain. These surfactants are commercially available from BASF Corporation of Mount Olive, N.J., in a variety of different molecular weights and with different values of "a" and "b" blocks. For example, Lutrol® F127 has a molecular weight range of 9,840 to 14,600 and where "a" is approximately 101 and "b" is approximately 56, Lutrol F87 represents a molecular weight of 6,840 to 8,830 where "a" is 64 and "b" is 37, Lutrol F108 represents an average molecular weight of 12,700 to 17,400 where "a" is 141 and "b" is 44, and Lutrol F68 represents an average molecular weight of 7,680 to 9,510 where "a" has a value of about 80 and "b" has a value of about 27.

Sugar ester surfactants include sugar fatty acid monoesters, sugar fatty acid diesters, triesters, tetraesters, or mixtures thereof, although mono- and di-esters are most preferred. Preferably, the sugar fatty acid monoester comprises a fatty acid having from 6 to 24 carbon atoms, which may be linear or branched, or saturated or unsaturated $C_6$ to $C_{24}$ fatty acids. The $C_6$ to $C_{24}$ fatty acids are preferably chosen from stearates, behenates, cocoates, arachidonates, palmitates, myristates, laurates, carprates, oleates, laurates and their mixtures, and can include even or odd numbers of carbons in any subrange or combination. Preferably, the sugar fatty acid monoester comprises at least one saccharide unit, such as sucrose, maltose, glucose, fructose, mannose, galactose, arabinose, xylose, lactose, sorbitol, trehalose or methylglucose. Disaccharide esters such as sucrose esters are most preferable, and include sucrose cocoate, sucrose monooctanoate, sucrose monodecanoate, sucrose mono- or dilaurate, sucrose monomyristate, sucrose mono- or dipalmitate, sucrose mono- and distearate, sucrose mono-, di- or trioleate, sucrose mono- or dilinoleate, sucrose polyesters, such as sucrose pentaoleate, hexaoleate, heptaoleate or octooleate, and mixed esters, such as sucrose palmitate/stearate.

Particularly preferred examples of these sugar ester surfactants include those sold by the company Croda Inc of Parsippany, N.J. under the names Crodesta F10, F50, F160, and F110 denoting various mono-, di- and mono/di ester mixtures comprising sucrose stearates, manufactured using a method that controls the degree of esterification, such as described in U.S. Pat. No. 3,480,616.

Use may also be made of those sold by the company Mitsubishi under the name Ryoto Sugar esters, for example under the reference B370 corresponding to sucrose behenate formed of 20% monoester and 80% di-, tri- and polyester. Use may also be made of the sucrose mono- and dipalmitate/stearate sold by the company Goldschmidt under the name "Tegosoft PSE". Use may also be made of a mixture of these various products. The sugar ester can also be present in admixture with another compound not derived from sugar; and a preferred example includes the mixture of sorbitan stearate and of sucrose cocoate sold under the name "Arlatone 2121" by the company ICI. Other sugar esters include, for example, glucose trioleate, galactose di-, tri-, tetra- or pentaoleate, arabinose di-, tri- or tetralinoleate or xylose di-, tri- or tetralinoleate, or mixtures thereof. Other sugar esters of fatty acids include esters of methylglucose include the distearate of methylglucose and of polyglycerol-3 sold by the company Goldschmidt under the name of Tegocare 450. Glucose or maltose monoesters can also be included, such as methyl O-hexadecanoyl-6-D-glucoside and O-hexadecanoyl-6-D-maltose. Certain other sugar ester surfactants include oxyethylenated esters of fatty acid and of sugar include oxyethylenated derivatives such as PEG-20 methylglucose sesquistearate, sold under the name "Glucamate SSE20", by the company Amerchol.

One of the characteristics of surfactants is the HLB value, or hydrophilic lipophilic balance value. This value represents the relative hydroplicility and relative hydrophobicity of a surfactant molecule. Generally, the higher the HLB value, the greater the hydrophilicity of the surfactant while the lower the HLB value, the greater the hydrophobicity. For the Lutrol® molecules, for example, the ethylene oxide fraction represents the hydrophilic moiety and the propylene oxide fraction represents the hydrophobic fraction. The HLB values of Lutrol F127, F87, F108, and F68 are respectively 22.0, 24.0, 27.0, and 29.0. The preferred sugar ester surfactants provide HLB values in the range of about 3 to about 15.

V. Bonded Phases

After preparation of the ultraporous sol gel monolith, the sol gel can be modified with a bonded phase if desired. Bonded phases can be prepared using conventional techniques known in the art, or as practiced in co-pending U.S.

Ser. No. 10/777,523 filed Feb. 12, 2004, adapted if necessary for modifying a monolithic form (e.g., flowing reactants through the monolith). Bonded phases can include hydrocarbyl moieties, such as $C_{1-100}$, or more typically $C_{1-30}$ (e.g., $C_{18}$ or $C_8$), aryl moieties (e.g., phenyl or naphthyl), or polar moieties such as cyano, urethane, carbamido, amino, sulfonamide, (e.g., cyanopropyl, $C_{15}H_{31}CONH(CH_2)_3Si(OMe)_3$, $CH_3CONH(CH_2)_3Si(OMe)_3$), $C_8H_{17}OCONH(CH_2)_3Si(OEt)_3$, $NC(CH_2)_3SiMe_2Cl$, and the like, without limitation. The silanes used in the preparation of bonded phases are available commercially or can be prepared by conventional synthetic methods. Silanes having polar moieties can be utilized to provide a bonded phase having polar moieties bonded thereto. Polar silanes can be synthesized by one skilled in the art of organic synthesis, for example, by reaction of the appropriate allyl ether, amide, carbamide, etc., with dimethylethoxysilane to yield the dimethylethoxysilane having the desired polar component. For example, O-alkyl-N-(trialkoxysilylalkyl)urethanes can be prepared as described in U.S. Pat. No. 6,071,410 to Nau et al. Additional polar silanes are described in U.S. Pat. Nos. 6,645,378 to Liu et al. and 5,374,755 to Neue et al.

In particular embodiments, the silane has the formula

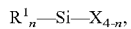

wherein $R^1$ is independently selected from hydrogen, $C_1$-$C_{100}$ substituted or unsubstituted hydrocarbyl, cycloalkyl, heterocycloalkyl, aryl, or heteroaryl; wherein the substituents are selected from $C_1$-$C_{12}$ hydrocarbyl, hydroxyl, alkoxy, halogen, amino, nitro, sulfo, cyano, glycidyl, carbamido, and carbonyl, wherein n is 0, 1, 2, or 3, wherein X is a leaving group. X can be a halogen, $C_1$-$C_{12}$ alkoxy, amino, or $C_1$-$C_{12}$ acyloxy, and when X is halogen, n is not 0.

Bonded phases can also include phases generated by endcapping. Endcapping is desirable in some embodiments, as it may decrease undesirable adsorption of basic or ionic compounds or provide particular desirable adsorption properties. Appropriate end capping reagents include short-chain silanes such as trimethylchlorosilane, trimethylsilylimidazole (TMSIM), bis-N,O-trimethylsilyltrifluoroacetamide (BSTFA), bis-N,O-trimethylsilylacetamide (BSA), trimethylsilyldimethylamine (TMSDMA), trimethylchlorosilane (TMS), and hexamethyldisilane (HMDS), and the like, without limitation. Preferred end-capping reagents include trimethylchlorosilane (TMS), trimethylchlorosilane (TMS) with pyridine, and trimethylsilylimidazole (TMSIM).

VI. Characterization of the Ultraporous Sol Gel Monoliths

The pore size distribution curve is determined from the derivative of the pore volume (V) with respect to the pore diameter (D) (dV/d log D), plotted against the pore diameter (D). The mode pore size is the pore size for which the value of dV/d log D of the pore size distribution curve is greatest (the maximum peak exhibited). This pore size distribution curve is derived from the adsorption isotherm obtained by measurement of the adsorption of nitrogen gas, for example, according to several equations. The adsorption isotherm measurement method generally involves cooling the sample to liquid nitrogen temperature, introducing nitrogen gas, and determining the amount of nitrogen adsorbed by fixed displacement or gravimetry. The pressure of the introduced nitrogen gas is gradually increased, and the adsorption of nitrogen gas at each equilibrium pressure is plotted to produce an adsorption isotherm. The pore size distribution curve can be derived from this adsorption isotherm according to the equation for the Cranston-Inklay method, Dollimore-Heal method, BET method, BJH method, and so forth.

As described herein, the total surface area and micropore volume can be conveniently determined using an instrument such as the Micromeritics TriStar 3000. The total surface area is preferably calculated using the BET method, and the micropore volume is calculated using the t-plot method, as described in by Mikail, R., et al. (1968) *J. Colloid Interface Sci.* 26:45. The t-plot method can be used to detect the presence of the micropores in the sample, and to determine their volume. The t-plot is a curve of the nitrogen adsorption (v/g) plotted against the mean film thickness (t) of the adsorption film (where the x-axis is the mean film thickness and the y-axis is the adsorption). The amount of nitrogen adsorbed versus thickness of the layer is linear if no micropores or mesopores exist. Conversely, the presence of micropores can be detected by the loss of nitrogen adsorption at a particular thickness, and the diameter of the pore that no longer provides accessible surface areas can be calculated.

Figure 2:
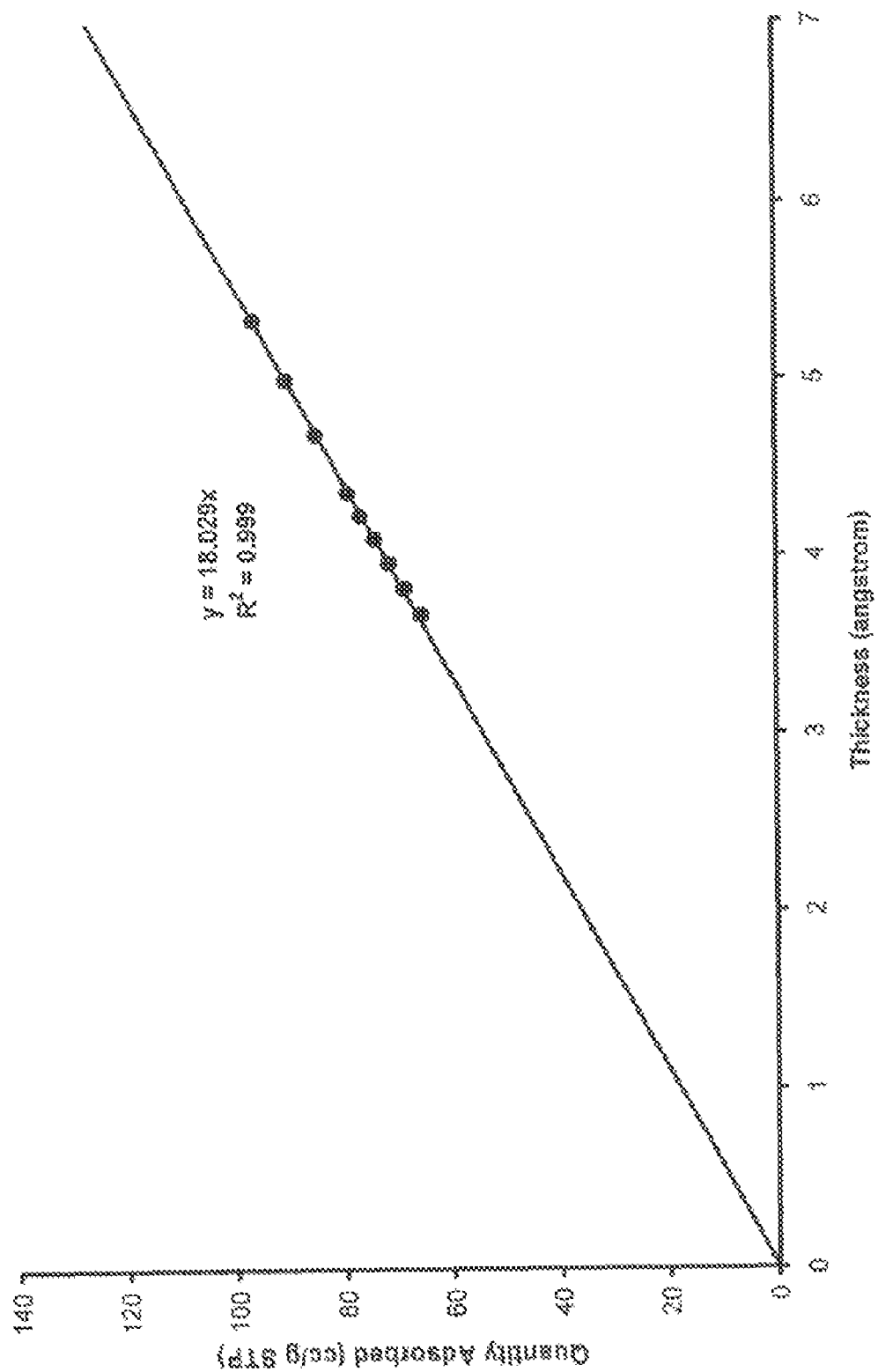
FIG. 2 illustrates the t-plot obtained for the ultraporous sol gel monolith produced by the procedures set forth in Example 2, indicating substantially no micropores.
Figure 3:
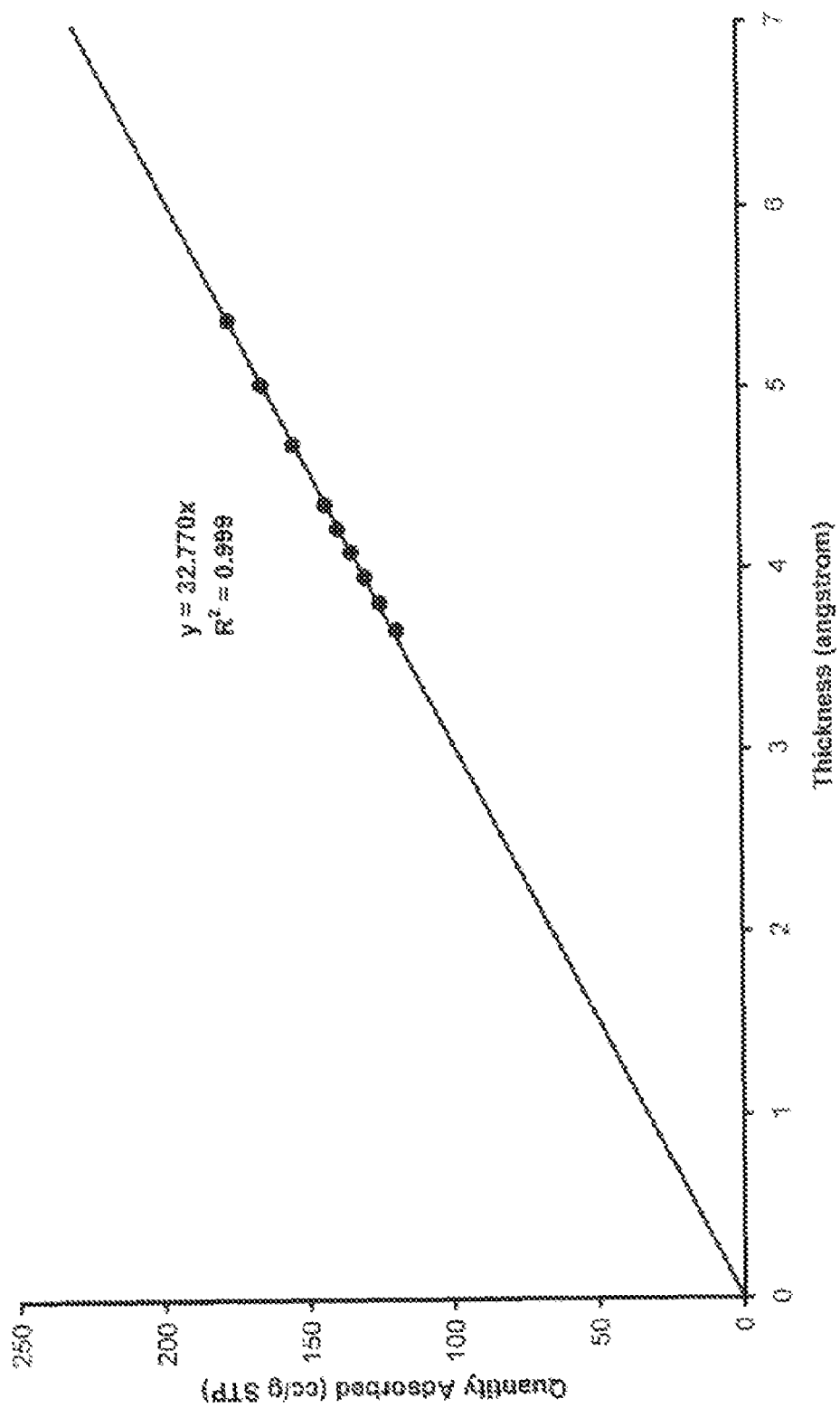
FIG. 3 illustrates the t-plot obtained for the ultraporous sol gel monolith produced by the procedures set forth in Example 4, indicating substantially no micropores.

In FIGS. 2 and 3, t-plots are shown that correspond to the experimental data obtained and presented in Examples 2 and 4. The intercept of the t-plot goes through zero, indicating that the micropore volume is virtually zero. The preparation of ultraporous sol gel monolith with substantially no micropores is a surprising and significant advance in the art.

Figure 4:
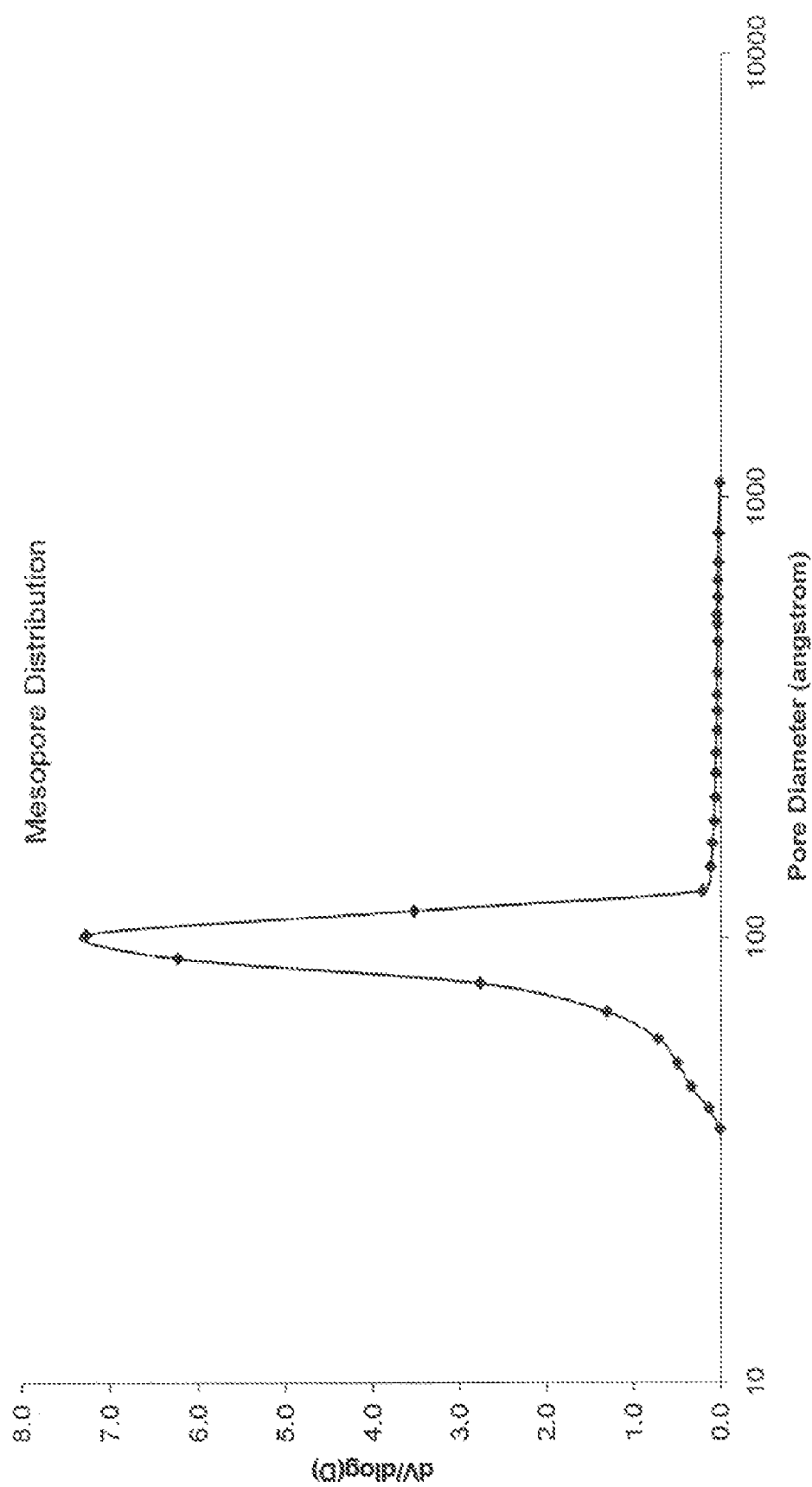
FIG. 4 illustrates the mesopore distribution of the ultraporous sol gel monolith produced by the procedures set forth in Example 1.
Figure 5:
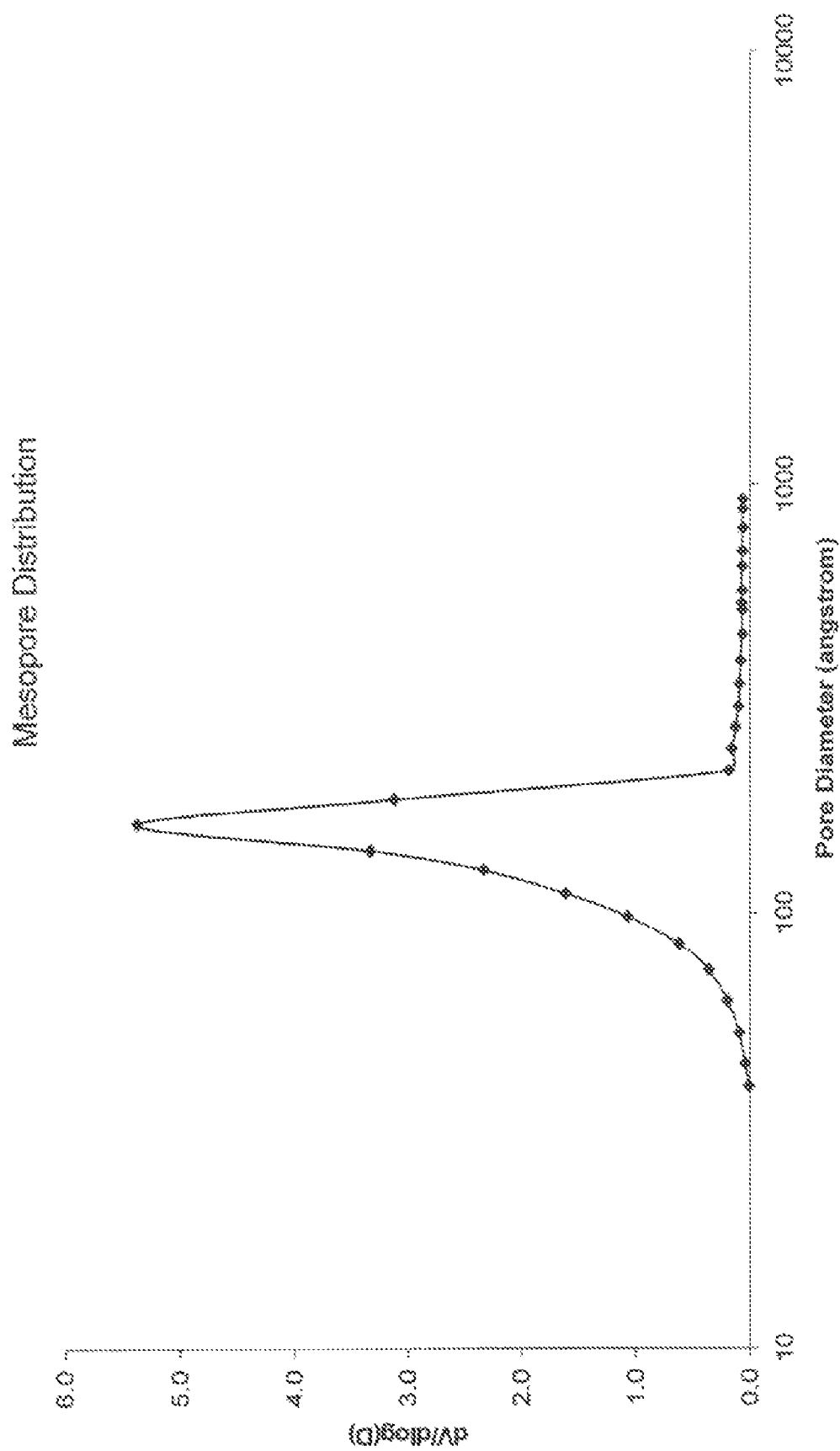
FIG. 5 illustrates the mesopore distribution of the ultraporous sol gel monolith produced by the procedures set forth in Example 2.

Mesopore distribution curves are shown in FIGS. 4 and 5. These plots demonstrate that the ultraporous sol gel monolith produced by the procedures set forth in Examples 1 and 2, respectively, have narrow pore size distributions centered at mesopore mode diameter of about 102 Å and 160 Å.

VII. Advantages of the Ultraporous Sol Gel Monolith

The methods for preparing the ultraporous sol gel monoliths are simple, cost effective and time saving. In contrast, the prior art methods require preparation of the sol gel and subsequent thermal or chemical reorganization treatments to modify the structure to generate or modify the mesopore distribution in the sol gel. These methods also generally fail to eliminate micropores that interfere with separations.

The ultraporous sol gel monoliths of the invention provide superior sorbents for chromatography as well as other analytical separations or sample preparation procedures. Micropores are virtually eliminated from the sol gel monolith prepared using the methods of the invention, providing a sorbent having predictable and controllable solvent and solute accessible volumes.

The monolithic structure is ultraporous, allowing low operating pressures, well below those routinely used in conventional HPLC separations. As shown in Example 8, the mobile phase pressures that were used with the ultraporous sol gel monolith are significantly lower than utilized in conventional HPLC. Alternatively, the ultraporous structure allows flow rates up to 10 times faster than used in conventional HPLC. Accordingly, the ultraporous sol gel monolithic structure allows increased separation speeds, and consequently, faster separations, which is a major advance in separation efficiency as well as laboratory analysis time and labor.

Sol gels can be formed directly in a capillary column or other receptacle, and pretreatment or etching of the capillary is optional for all applications due to the high concentration of matrix dissolving catalyst in the solution. No frit is required to contain the sol gel, and no packing of columns is required, which is a time and labor intensive step.

The sol gel monoliths can be conveniently adapted to microfluidics applications and devices, and could be used advantageously in mass spectrometric or other analytical procedures where higher sensitivity is advantageously coupled with smaller analytical sorbent volumes at the same or faster solvent flow rates.

VIII. Applications

The ultraporous sol gel monoliths produced by the methods of this invention can be advantageously used in chromatographic and analytical separations applications in the form of chromatographic columns or other devices, where such devices have improved flow properties, reduced back pressure, reduced micropores and reduced silanol residues, which eliminate peak tailing for basic analytes. For example, the sol gel monolith can be incorporated into capillary column, or a cartridge system. Since monolithic sorbents are rigid and dead space may arise during the cladding, the cladding of the monoliths to provide columns, filters, or cartridges or the like having no dead space and in a pressure-stable manner can be challenging. In one embodiment, the sol gel monolith can be used to prepare a cartridge, for example, as described in U.S. Pat. No. 6,797,174, which describes a clad column with a monolithic sorbent on which a cap is installed at least at one end, and a connecting system consisting of at least one divided supporting screw and at least one end piece which is screwed onto the supporting screw for the connection of eluent feed and discharge. Alternatively, as described in Example 8, the sol gel monolith can be incorporated into a cartridge system without the use of a cap.

Figure 1B:
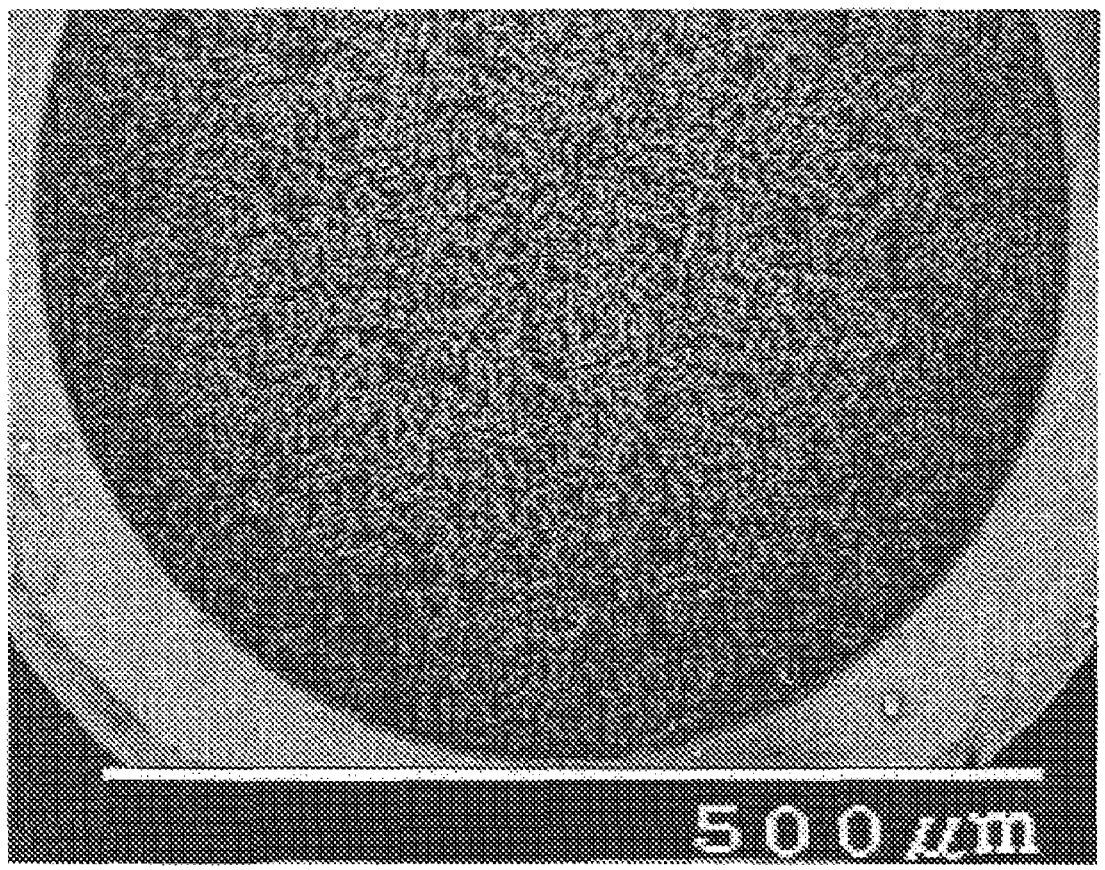
FIG. 1B shows a scanning electron micrograph showing a cross section of a capillary column having an internal diameter of 530 µm containing an ultraporous sol gel monolith.

In a particularly advantageous embodiment, the chromatographic device is a chromatographic column, such as an HPLC column, as described in Example 8. FIG. 1B shows a scanning electron micrograph of a cross-section of an ultraporous sol gel monolith formed in capillary tubing having an internal diameter of 530 µm. The ultraporous monolithic structure can be seen, and can be advantageously applied to HPLC separations with improved flow properties.

The ultraporous sol gel monoliths can also be used in planar form for planar applications (e.g., thin layer applications), such as TLC plates or as a component of a microfluidics device utilizing planar separation, as well as other planar geometries such as filtration devices and membranes, solid phase extraction media, or microtiter plates. Any shape can be formed, without limitation, such as rod shaped, spheres, hollow or filled structures (e.g., hollow tubes), flat sheets, fibers, chips, micro- or nano-sized wires or other shapes useful in microfluidics applications.

The ultraporous sol gel monoliths can also be solidified into a porous glass monolith by subjecting the monolith to high temperature calcination, and is also useful in this form for chromatographic separation or other purposes by modifying its pore surfaces. For example, polymeric, organic or inorganic phases and/or layers can be bonded and/or coated onto porous glass monolith pore surfaces to provide particular adsorption properties.

The ultraporous sol gel monoliths can also be used in other applications, such as filtration, solid phase synthesis, bioreactors, catalysis, resins, sensor devices, medical devices and drug or other active agent delivery platforms, and the like. The methods are also applicable to the preparation of devices for carrying out such applications. The ultraporous sol gel monoliths can include inorganic as well as organic or biological components. The ultraporous sol gel monoliths can be used as a stationary phase that includes ultraporous inorganic/organic and/or biological hybrid materials. The stationary phase may be introduced by polymerization in situ or by packing, inserting, coating, impregnating, cladding, wrapping, or other art-recognized techniques, etc., depending on the requirements of the particular device. In a preferred embodiment, the ultraporous sol gel monolith is formed in situ in such devices. In another preferred embodiment, the ultraporous sol gel monolith is formed in a mold and transferred to the site of intended use.

In a preferred embodiment, a method of separating a mixture of analytes is provided, comprising applying the mixture of analytes to the ultraporous sol gel monolith, and eluting the analytes using a mobile phase. Suitable separations can be performed using thin layer chromatography, high performance liquid chromatography, reversed phase chromatography, normal phase chromatography, ion chromatography, ion pair chromatography, reverse phase ion pair chromatography, ion exchange chromatography, affinity chromatography, hydrophobic interaction chromatography, size exclusion chromatography, chiral recognition chromatography, perfusion chromatography, electrochromatography, partition chromatography, microcolumn liquid chromatography, capillary chromatography, capillary zone electrophoresis (CZE), nano-LC, open tubular liquid chromatography (OTLC), capillary electrochromatography (CEC), liquid-solid chromatography, preparative chromatography, hydrophilic interaction chromatography, supercritical fluid chromatography, precipitation liquid chromatography, bonded phase chromatography, fast liquid chromatography, flash chromatography, liquid chromatography-mass spectrometry, gas chromatography, microfluidics based separations, chip based separations or solid phase extraction separations.

In particular embodiments, the ultraporous sol gel monoliths of the invention can be used in a method of preparing devices for capillary and microfluidics applications, which typically utilize small column internal diameters (<100 micron i.d.) and low mobile phase flow rates (<300 mL/min). Techniques such as capillary chromatography, capillary zone electrophoresis (CZE), nano-LC, open tubular liquid chromatography (OTLC), and capillary electrochromatography (CEC) offer numerous advantages over conventional scale high performance liquid chromatography (HPLC). These advantages include higher separation efficiencies, high-speed separations, analysis of low volume samples, and the coupling of 2-dimensional techniques. However, even these applications can benefit from the ultraporous sol gel monoliths described herein, which provides the possibility of even higher flow rates and more uniform and controllable pore size distributions.

Microchip-based separation devices have been developed for rapid sample analysis. Examples of microchip-based separation devices include those for capillary electrophoresis, capillary electrochromatography and high-performance liquid chromatography. For example, the sol gel monolith can be incorporated into a chromatographic chip, which can be made, for example, by forming grooves on a plate and forming a silica gel having a monolithic bimodal pore structure in the grooves. A representative chromatographic chip and method for preparing and using it is described in U.S. Patent Application Publication No. 20030230524 to Naohiro. These and other separation devices are capable of fast analyses and provide improved precision and reliability compared to other conventional analytical instruments. Compared to other conventional separation devices, these microchip-based separation devices have higher sample throughput, reduced sample and reagent consumption, and reduced chemical waste. The liquid flow rates for microchip-based separation devices range from approximately 1-300 nanoliters per minute for most applications. The ultraporous sol gel monoliths described herein can be incorporated into these microfluidics designs, providing a monolithic sorbent within microchannels on microchip-based separation device, thereby providing greater flow rates for microchip applications as well.

It is to be understood that while the invention has been described in conjunction with the preferred specific embodiments thereof, that the description above as well as the examples that follow are intended to illustrate and not limit the scope of the invention. The practice of the present invention will employ, unless otherwise indicated, conventional techniques of organic chemistry, polymer chemistry, biochemistry and the like, which are within the skill of the art. Other aspects, advantages and modifications within the scope of the invention will be apparent to those skilled in the art to which the invention pertains. Such techniques are explained fully in the literature.

In the following examples, efforts have been made to ensure accuracy with respect to numbers used (e.g., amounts, temperature, etc.) but some experimental error and deviation should be accounted for. Unless indicated otherwise, temperature is in degrees ° C. and pressure is at or near atmospheric. All solvents were purchased as HPLC grade, and all reactions were routinely conducted in the air unless otherwise indicated. Unless otherwise indicated, the reagents used were obtained from the following sources: PEG and TEOS were obtained from Alfa Aesar, surfactants from BASF, and HF from Fisher Scientific.

| Abbreviations: | |
|---|---|
| TEOS | tetraethoxysilane |
| PEG | polyethylene glycol |
| HF | hydrofluoric acid |

EXAMPLE 1

Formation of a Sol Gel Monolith without Micropores

Preparation of the Sol Gel:

Polyethylene glycol (PEG) (1.1 g, MW 20,000) was dissolved in the mixture of 2.5 g hydrofluoric acid (HF, 1.2 M) and 4.3 g methanol. While stirring, tetraethoxysilane (TEOS, 5.6 g) was introduced into the solution and formed a uniform mixture. Five minutes later, the mixture was cast into test tubes and kept at 5° C. The sols became white gels after half an hour, which were then dried and calcined for 10 hours at a temperature of 600° C. FIG. 1A shows a scanning electron microscopic (SEM) image (×3000) of the gel structure. The SEM photomicrograph confirms that the sol gel has an ultraporous monolithic structure.

Characterization of the Sol Gel:

Using a Micromeritics TriStar 3000 (Norcross, Ga.), the BET surface area was determined to be 531 $m^2/g$, mesopore volume was 1.13 cc/g and mesopore mode diameter was 102 Å, as shown in FIG. 4. t-Plot analysis indicated virtually no micropores. The total pore volume of 5.4 cc/g was determined using mercury intrusion (Mercury Porosimeter, Porous Materials Incorp., Ithaca, N.Y.). This measurement technique indicates the presence of macropores having a diameter of about 1.3 μm.

This experiment demonstrates that the method for forming the ultraporous sol gel monolith produces a highly porous structure (total porosity>90%) containing macropores having pore diameters of about 1.3 μm, and mesopores having a pore diameter of about 100 Å. The mesopore volume was about 21% of the total pore volume. Virtually no micropores were observed.

EXAMPLE 2

Formation of an Inorganic Sol Gel Monolith

In a similar experimental design to that described in Example 1, PEG (1.06 g, MW 10,000) was dissolved in a solution mixture of methanol (4.31 g), water (1.33 g) and hydrofluoric acid (HF, 1.16 g, 2.6 M). While stirring, TEOS (5.60 g) was introduced into the mixture and formed a uniform solution. After 5 minutes, the sol was cast into test tubes and kept at 5° C. About 30 minutes later, all sols became white gels, which were dried and calcined at 600° C. The total pore volume was measured to be 4.6 cc/g using a mercury intrusion test. Nitrogen absorption was done on Micromeritics TriStar 3000, BET surface area was 290 $m^2/g$, the mesopore mode diameter was 162 Å, as shown in FIG. 5, and the mesopore volume was 1.50 cc/g ($P/P_0$=0.98). Virtually no micropores were detected using t-plot, as shown in FIG. 2

EXAMPLE 3

Formation of an Inorganic Sol Gel Monolith

PEG (0.71 g, MW 20,000) was dissolved in a solution mixture of methanol (2.87 g), ethanol (1.65 g), water (0.88 g) and hydrofluoric acid (HF, 0.77 g, 2.6 M). While stirring, tetraethoxysilane (TEOS, 3.74 g) was introduced into the mixture and formed a uniform solution. After 5 minutes, the sol was cast into test tubes and kept at 25° C. About 40 minutes later, all sols became white gels, which were dried and calcined at 600° C. The total pore volume was measured to be 5.0 cc/g using a mercury intrusion test. Nitrogen absorption was performed using a Micromeritics TriStar 3000, and the BET surface area 452 $m^2/g$, the mesopore mode diameter was 142 Å, and the mesopore volume was 1.34 cc/g ($P/P_0$=0.98). Virtually no micropores were detected using t-plot.

EXAMPLE 4

Formation of an Inorganic Sol Gel Monolith without Micropores

The nonionic surfactant Pluronic F68 (0.44 g, BASF) was dissolved in a mixture of 1.11 g water, 3.59 g methanol, 2.07 g reagent alcohol and 0.96 g HF (2.6 M). While stirring, 5.0 ml TEOS (4.67 g) was introduced into the above solution and formed a uniform mixture. After 5 minutes, the sol was cast into test tubes and kept at room temperature. After 30 minutes, all sols became white gels, which were then dried and calcined for 10 hours at a temperature of 600° C.

BET surface area, mesopore volume and mode diameter measurements were performed using a Micromeritics TriStar 3000: the BET surface area was 526 $m^2/g$, the mesopore volume was 1.46 cc/g, and the mesopore mode diameter was 136 Å. Virtually no micropores were detected using t-plot analysis, as shown in FIG. 3. The total pore volume was determined as about 6.9 cc/g using a mercury intrusion test. The mesopore volume was about 21% of the total pore volume.

EXAMPLE 5

Formation of an Inorganic Sol Gel Monolith without Micropores

The nonionic surfactant Pluronic F68 (0.88 g, BASF) was dissolved in a mixture of 1.11 g water, 3.59 g methanol, 2.07 g reagent alcohol and 0.96 g HF (2.6 M). While stirring, 5.0 ml TEOS (4.67 g) was introduced into the above solution and formed a uniform mixture. After 5 minutes, the sol was cast into test tubes and kept at 5° C. After about one hour, all sols became white gels, which were dried and calcined for 10 hours at a temperature of 600° C.

BET surface area, mesopore volume and mode diameter measurements were performed using a Micromeritics TriStar 3000. The BET surface area was 550 $m^2/g$, the mesopore volume was 1.36 cc/g, and the mesopore diameter was 108 Å. The total pore volume was determined as about 6.2 cc/g using a mercury intrusion test. Virtually no micropores were detected using t-plot analysis. The mesopore volume was about 22% of the total pore volume.

EXAMPLE 6

Formation of a Hybrid Organic/Inorganic Sol Gel Monolith without Micropores

In a similar experimental design to that described in Example 1, the nonionic surfactant Pluronic F68 (0.47 g, MW 8,400) was dissolved in a solution mixture of methanol (3.78 g), reagent alcohol (2.17 g) and hydrofluoric acid (HF, 2.62 g, 1.2 M). While stirring, a mixture of tetraethoxysilane (TEOS, 4.67 g) and methyl triethoxysilane (0.22 g) was introduced into the solution and formed a uniform solution. After 5 minutes, the sol was cast into test tubes and kept at 5° C. The sols became white gels within 30-40 minutes, and were dried at 180° C.

The total pore volume was estimated to be above 5.6 cc/g and porosity was above 90%. Using a Micromeritics TriStar 3000, the BET surface area measurement was 614 $m^2/g$, the mesopore volume was 1.25 cc/g and the mesopore mode diameter was 104 Å. The mesopore volume was about 22% of the total pore volume. Virtually no micropores were detected using t-plot.

This experiment demonstrates that the use of the combination of organic and inorganic silanes results in a sol gel with a porosity of greater than 90%. As before, virtually no micropores were observed.

EXAMPLE 7

Formation of a Hybrid Organic/Inorganic Sol Gel Monolith without Micropores

The nonionic surfactant Pluronic F68 (0.47 g, MW 8,400) was dissolved in a solution mixture of methanol (3.78 g), reagent alcohol (2.17 g) and hydrofluoric acid (HF, 3.06 g, 1.2 M). While stirring, a mixture of tetraethoxysilane (TEOS, 4.67 g) and octyl triethoxysilane (0.34 g) was introduced into the solution and formed a uniform solution. After 5 minutes, the sol was cast into test tubes and kept at 25° C. Fifteen to twenty minutes later, all sols became white gels, which were dried at 180° C.

Total pore volume was estimated to be about 5.2 cc/g and porosity was above 90%. A multi-point BET surface area measurement of 663 $m^2/g$ was obtained using a Micromeritics TriStar 3000, the mesopore volume was 1.11 cc/g and the mesopore mode diameter was about 85 Å. Virtually no micropores were detected using t-plot. The mesopore volume was about 21% of the total pore volume.

This experiment demonstrates that the use of the combination of organic and inorganic silanes results in a sol gel with a porosity of greater than 90%. The surface area appears to be increased relative to the sol gel produced using only TEOS. As before, virtually no micropores were observed.

EXAMPLE 8

Comparison of a Chromatography Column Prepared Using an Inorganic Sol Gel Monolith with a Conventional HPLC Chromatography Column Prepared Using Silica Beads A chromatography column was prepared using a glass-lined stainless steel tubing (GLT) having an internal diameter of 0.3 mm and 150 mm in length. A solution was prepared as described in Example 1, and injected into the GLT tubing without etching or pretreatments and kept at 5° C. overnight. The column was then dried and calcined for 10 hours at a temperature of 600° C.

The column characteristics were tested by measuring the pressure required to run solvent through the column. The column flows at a flow rate of above 30 microliter per minute operated at about 100 bars. In contrast, a column of the same diameter and length packed with conventional 5 micron silica beads exhibited a flow rate of only about 4 microliter per minute under the same conditions. The mobile phase in each case was methanol/water 80:20.

A rod of dimensions 2.0 mm diameter and 50 mm length was also prepared as described in Example 1. Shrinkable Teflon tubing was used to protect the rod and produce a column without any caps on the ends. This column exhibited a flow rate of 200 µl/min with back pressure less than 100 psi. In contrast, a conventional column with the same inner diameter and length, packed with 5 micron particles, exhibited a flow rate of 200 µl/min at above 500 psi. The mobile phase in each case was methanol/water 80:20.

These results demonstrate the superior flow characteristics provided by the ultraporous sol gel monolith in comparison with a conventional chromatographic sorbent.

What is claimed is:

1. A method of separating a mixture of analytes, comprising applying the mixture of analytes to a sol gel monolith having a total porosity of up to about 97% with substantially no pores having diameters less than about 2.0 nm; and eluting the analytes using a mobile phase.

2. The method of claim 1, wherein the method of separating is thin layer chromatography, high performance liquid chromatography, reversed phase chromatography, normal phase chromatography, ion chromatography, ion pair chromatography, reverse phase ion pair chromatography, ion exchange chromatography, affinity chromatography, hydrophobic interaction chromatography, size exclusion chromatography, chiral recognition chromatography, perfusion chromatography, electrochromatography, partition chromatography, microcolumn liquid chromatography, capillary chromatography, capillary zone electrophoresis (CZE), nano-LC, open tubular liquid chromatography (OTLC), capillary electrochromatography (CEC), liquid-solid chromatography, preparative chromatography, hydrophilic interaction chromatography, supercritical fluid chromatography, precipitation liquid chromatography, bonded phase chromatography, fast liquid chromatography, flash chromatography, liquid chromatography-mass spectrometry, gas chromatography, microfluidics based separations, chip based separations, or solid phase extraction separations.

* * * * *